No. 813,870. PATENTED FEB. 27, 1906.
L. J. DIRAND.
EXTENSIBLE SPRING ROLLER.
APPLICATION FILED NOV. 29, 1904.
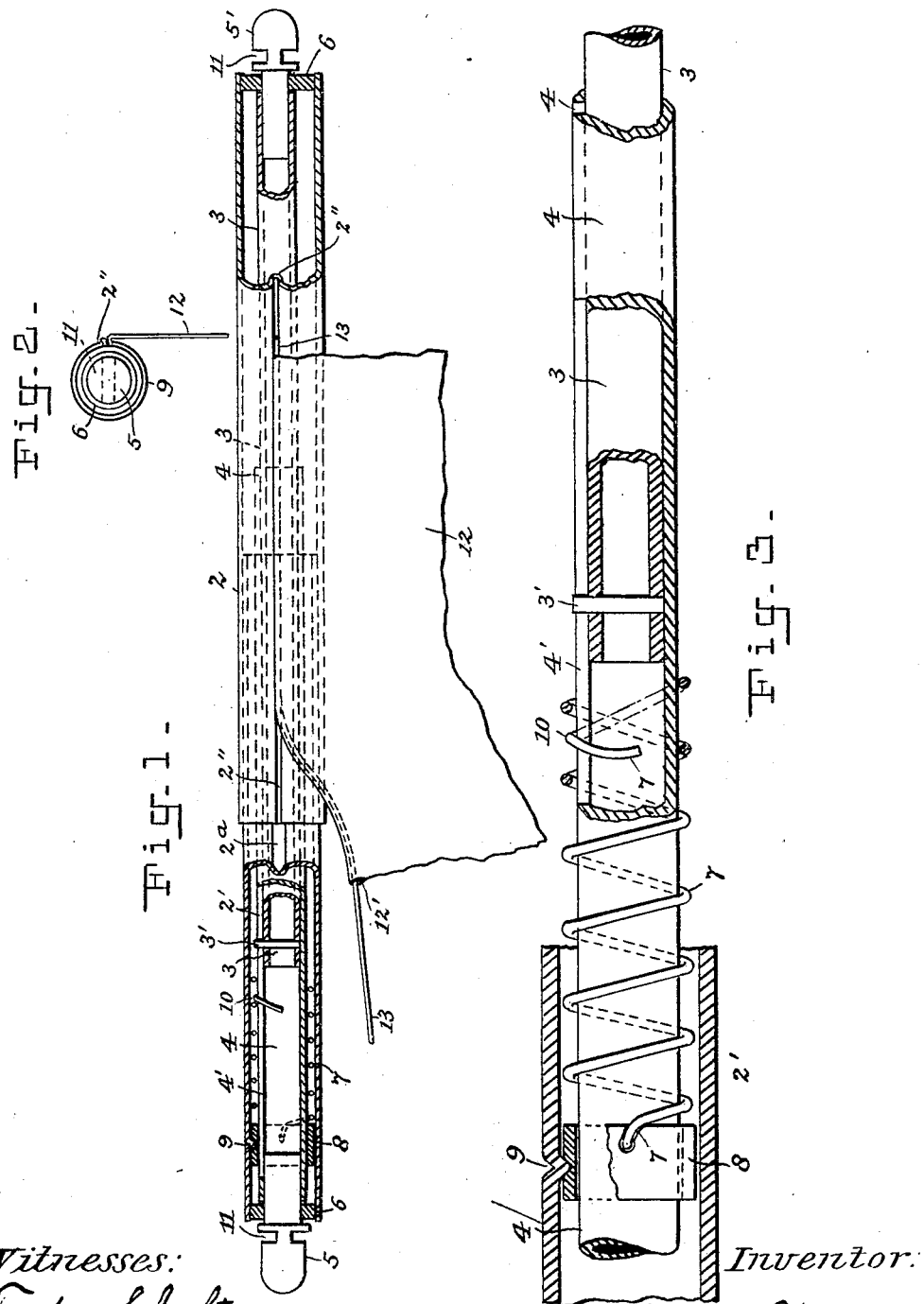
Witnesses:
Freda Schultz
Pierson L. Wells
Inventor:
Louis J. Dirand,
by Chas. H. Davids,
his Attorney.

UNITED STATES PATENT OFFICE.

LOUIS J. DIRAND, OF TORRINGTON, CONNECTICUT, ASSIGNOR, BY DIRECT AND MESNE ASSIGNMENTS, TO THE TORRINGTON NOVELTY MANUFACTURING AND SUPPLY COMPANY, OF TORRINGTON, CONNECTICUT, A CORPORATION OF CONNECTICUT.

EXTENSIBLE SPRING-ROLLER.

No. 813,870.　　　　Specification of Letters Patent.　　　　Patented Feb. 27, 1906.

Application filed November 29, 1904. Serial No. 234,790.

*To all whom it may concern:*

Be it known that I, LOUIS J. DIRAND, a citizen of the United States, residing at Torrington, in the county of Litchfield and State of Connecticut, have invented a new and useful Improvement in Extensible Spring-Rollers, of which the following is a specification.

This invention is applicable generally to spring-rollers used in the arts for a variety of purposes—such, for instance, as an adjustable support for a shade, a curtain, a cover, or other flexible article—and is especially designed to furnish a spring-roller construction enabling the length of the roller to be readily increased or diminished to suit the requirements of any particular conditions.

The present roller construction comprises a pair of telescoping members, one an outer or exterior tubular member and the other an inner member encircled by a coiled or helical spring, which is placed under tension when one member is rotated relatively of the other in the usual manner.

In the drawings accompanying the present specification, Figure 1 is a side elevation of a spring-roller embodying my present improvements, part being broken away to show the outer and the inner telescoping members. Fig. 2 is an end elevation. Fig. 3 is an enlarged elevational view of the inner telescoping member removed from its position within the exterior member and shows the coiled spring which encircles it and likewise the sleeve through which it is adapted to slide.

Reference characters are relatively alike throughout the drawings.

The exterior member of the roller constitutes the means to which the edge of the curtain, flexible cover, &c., may be secured and upon which and from which this flexible element is wound up and unwound, respectively. This member is of telescopic construction, comprising a tube 2 and fitted to slide lengthwise therewithin a tube 2'. While the two may be readily moved lengthwise of each other, their relative rotation is prevented by some suitable means, here consisting of a longitudinal depressed portion 2'' of the tube 2, which fits within a counterpart channel 2ª in the exterior of the tube 2'. Within the exterior telescoping member is an inner member of similar construction, the parts of which are likewise longitudinally movable but rotarily relatively immovable. The illustrated construction of this inner member comprises a tube 3, fitting within a tube 4 and having a projecting pin 3', adapted to slide lengthwise between the walls of a slot 4' in the latter tube.

Secured within one end of the inner telescoping member is a stud or projecting pin 5, and extending from the opposite end thereof is a similar stud 5'. These studs project beyond the respective end plates 6 6 of the exterior telescoping member, and while they are journaled in such end plates they are so formed as to preclude their axial movement relatively to the plates in which they are mounted. One end of the coiled or helical spring 7 is relatively fixed (so far at least as rotary movement is concerned) to one part of the inner member, and the other end thereof to a part of the outer member, although the means whereby this securing is effected is not such as to prevent the free and ready telescoping of the parts. Such results are accomplished by the construction illustrated, in which one end of the spring is caught into a sleeve 8, slidably mounted upon the tube 4 and secured to one of the outer telescoping tubes, as by indenting the latter, (see 9,) in the event that the sleeve is made of wood and the tube of metal. The other end of the coiled spring is hooked over (see 10) and enters the slot 4'. It is evident from this construction that the spring may readily perform its function throughout the possible telescoping adjustment of the parts.

The projecting ends of either one or both of the studs 5 5' may have the usual slot 11 for engaging with the usual slotted supporting-bracket, (not shown,) and while no holding-dogs are shown for retaining the telescoping members in the position to which they may be rotarily adjusted it is obvious that these may be provided when desired, since their construction and modes of operation are well known.

Preferably the shade, cover, &c., 12, is removably secured to the exterior member. For instance, a rod 13 may be run through a loop 12' in the cover end and the latter then laid in the depressed portion 2'' and channel 2ᵃ of the exterior member, whereupon if the cover is wrapped one or more times around the latter it will be securely held in place.

I claim as new and as my invention—

1. A telescoping spring-roller comprising in combination, an exterior telescoping member, an inner telescoping member provided with a longitudinal slot, a sleeve slidably mounted on the inner member and secured to the exterior member, and a spring one of whose ends is secured to said sleeve and whose other end enters said slot.

2. In a telescoping spring-roller, the combination of a pair of telescoping tubes constituting an exterior member, a pair of telescoping tubes constituting an inner member, studs extending from the inner member and upon which the exterior member is mounted, and a spring interposed between said members.

3. In a telescoping spring-roller, the combination of a pair of telescoping tubes constituting an exterior member, plates at the ends of said member, a pair of telescoping tubes constituting an inner member, slotted studs extending from the inner member and upon which said plates are mounted, and a spring interposed between said members.

4. In a telescoping spring-roller, the combination of a pair of telescoping tubes constituting an exterior member whose parts are relatively immovable radially, a similar telescoping inner member which is provided with a longitudinal slot, studs extending from the inner member and upon which the exterior member is rotatably mounted, a sleeve slidably mounted upon the inner member and which is secured to the exterior member, and a spring one of whose ends is secured to said sleeve and whose opposite end enters said slot.

In testimony whereof I have signed my name to this application in the presence of two subscribing witnesses.

LOUIS J. DIRAND.

Witnesses:
HOMER R. SCOVILLE,
CHARLES ARCHAMBO.